United States Patent [19]

Shimada

[11] Patent Number: 5,592,301
[45] Date of Patent: Jan. 7, 1997

[54] VIDEO CAMERA APPARATUS

[75] Inventor: Mitsuhiro Shimada, Chiba, Japan

[73] Assignee: Sony Corporation, Tokyo, Japan

[21] Appl. No.: 420,455

[22] Filed: Apr. 9, 1995

Related U.S. Application Data

[63] Continuation of Ser. No. 152,332, Nov. 12, 1993, abandoned.

[30] Foreign Application Priority Data

Nov. 12, 1992 [JP] Japan ................................. 4-302282

[51] Int. Cl.$^6$ ................................................. H04N 5/225
[52] U.S. Cl. ........................... 386/117; 358/906; 348/207; 386/46
[58] Field of Search ..................... 358/335, 342, 358/310, 906; 348/207; 360/33.1, 35.1; H04N 5/78, 5/225

[56] References Cited

U.S. PATENT DOCUMENTS

| | | | |
|---|---|---|---|
| 4,858,031 | 8/1989 | Fukuta | 358/906 |
| 4,943,867 | 7/1990 | Suetaka et al. | 358/906 |
| 4,959,735 | 9/1990 | Kawai | 358/906 |
| 5,027,223 | 6/1991 | Suetaka et al. | 358/906 |
| 5,032,927 | 7/1991 | Watanabe et al. | 358/335 |
| 5,062,010 | 10/1991 | Saito | 358/906 |
| 5,130,813 | 7/1992 | Oie et al. | 358/906 |
| 5,189,524 | 2/1993 | Yoshida et al. | 358/906 |

*Primary Examiner*—Thai Q. Than
*Assistant Examiner*—Khoi Truong
*Attorney, Agent, or Firm*—Pasquale Musacchio; Jerry A. Miller

[57] ABSTRACT

A video camera has a time setting portion for setting a shot-time of one cut and a display member for displaying the information indicative of elapsed time. Further the video camera has a auto-stop mode which automatically stops the recording operation of the video camera stopped when the recording time exceeds the shot-time of one cut set by the time-set portion.

8 Claims, 3 Drawing Sheets

VIDEO CAMERA APPARATUS

This is a continuation of application Ser. No. 08/152,332 filed on Nov. 12, 1993 now abandoned which is hereby incorporated by reference.

FIELD OF THE INVENTION

This invention relates to a video camera apparatus combined with a VTR having playback capability (a video camera combined with a VTR) and more particularly to a video camera combined with a VTR having an electric view finder (EVF) showing an accumulated value of a tape counter and/or a present time.

BACKGROUND OF THE INVENTION

Conventional video cameras having a VTR are known which include an EVF for displaying an accumulated or total value of a tape counter and/or a present time.

It is frequently desirable during normal playback of a recorded scene to display the scene for a sufficient period of time so as to enable a viewer to observe many of the aspects and details of the scene. Generally, an inexperienced user of a video camera tends to shoot a scene for a insufficient period of time and to frequently move the video camera in order to shoot many different scenes. During playback, this results in a relatively rapid display of many different scenes, one scene after another. However, it is difficult for a viewer to observe many of the aspects of each scene when recorded in this manner. Moreover, scenes which have not been recorded for a predetermined time period are difficult to edit since the time period for each scene is essentially random. As such, it is desirable to shoot each cut or scene for a predetermined time period. It is also desirable to record the scene for an optimum time period. Furthermore, it is also desirable for a user to know how much time has elapsed after recording has started.

SUMMARY OF THE INVENTION

One object of this invention is to provide a video camera apparatus which can be easily reposed for a certain time period when an user takes a respective cut.

According to a first embodiment of this invention, a video camera apparatus includes a lens for focusing a light reflected from what is shot, an image pickup device for changing the light gone through the lens to an electric signal, a camera signal processing circuit for changing an output signal of the image pickup device to a video signal and a video signal recording portion for recording an output signal of the camera signal processing circuit. The video camera apparatus further includes a display member for displaying a state of the video signal recording portion, a counter for counting an operating time on the video signal recording portion and a system controller for controlling a recording state of the video signal recording portion and a state of the display member. The counter is reset whenever a recording of the video signal starts. It also counts a lapsed time after the recording starts. A matter relating the lapsed time is displayed or recorded on the display member.

According to a second embodiment of this invention, there is provided a method for shooting a scene by using a video camera apparatus which has a camera signal processing circuit for changing an output signal of an image pickup device to a video signal, video signal recording portion for recording an output signal of the camera signal processing circuits and a display member for displaying a state of the video signal recording circuit and a counter for counting an operating time on the video signal recording portion. The method includes the steps of setting a recording start of a video signal, starting a recording after the setting of the recording start, resetting the counter, counting a lapsed time after the recording starts and displaying or recording a matter relating the lapsed time.

DETAILED DESCRIPTION OF THE INVENTION

Making reference to FIG. 1, one example of this invention is explained as follows. This example is applied to a video camera combined with a VTR.

Figure 1:
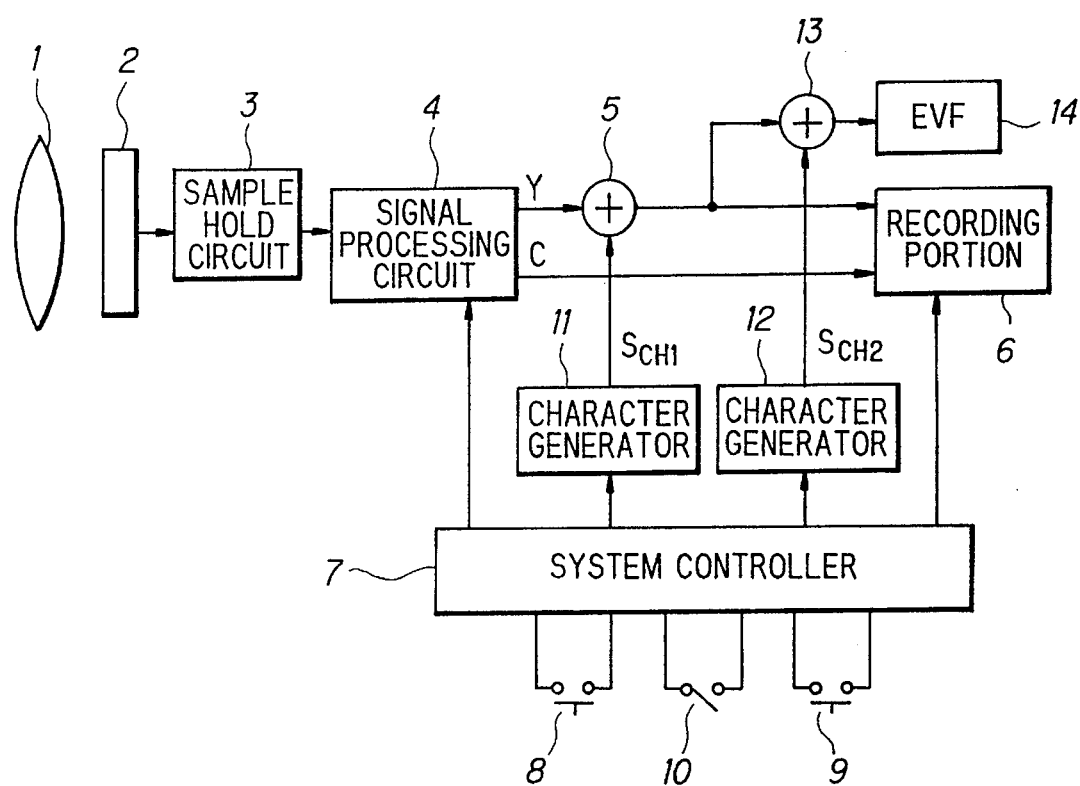
FIG. 1 is a block diagram showing an example of this invention.

An image pickup lens 1 and a CCD solid image pickup device 2 are shown in FIG. 1. The output signal of the image pickup device 2 is supplied to a camera signal processing circuit 4 through a sample-hold circuit 3 for signal separation. A luminance signal Y and a color signal C are formed by a conventional signal processing.

The luminance signal Y output from the camera signal processing circuit 4 is supplied to a recording portion 6 through an adder 5. The color signal C output from the camera signal processing circuit 4 is directly supplied to a recording portion 6.

Further, a system controller 7 is provided for controlling the camera signal processing circuit 4 and the recording portion 6. A push-button recording switch, 8 (S/S button) is provided for activating a recording operation (recording start) or deactivating the recording operation (recording stop). The recording start operation is activated by pushing the S/S button 8 "on" and the recording stop operation is activated by pushing the S/S button 8 "off". A push-button time set switch 9 (time-set button) is provided for selecting and setting a predetermined shot time of one cut (cut time). The initial cut time may be set by actuating the time set button 9. Successive actuations of the set button 9 increases the initial or previous cut time by an amount equivalent to the initial cut time. By way of example, the initial cut time may be 10 seconds and is set by actuating the time set button 9. A subsequent actuation of the set button 9 then increases the cut time by 10 seconds to 20 seconds for each scene to be shot.

A connecting switch 10 (auto-stop SW) is provided for actuating an auto stop-mode. The auto-stop SW 10 stops the recording operation automatically when the actual recording time exceeds the cut time previously set by the time-set button 9. When this auto-stop SW 10 is on, the auto stop-mode is operated.

The S/S button 8, the time-set button 9 and auto-stop SW 10 are connected to the system controller 7. Other operation keys connected to the system controller 7 are not shown in order to simplify the figure.

A first character generator (character GEN) 11 is provided for generating a display signal S CH1 to display a date, a time and a counted value of a tape counter. The character GEN 11 is controlled by the system controller 7. The display signal S CH1 output from the character GEN 11 is supplied to the adder 5 and is added to the luminance signal Y.

A second character generator (character GEN) 12 is provided for generating a display signal S CH2 to display the amount of time that has elapsed after the start of the recording operation. The character GEN 12 is controlled by the system controller 7. The display signal S CH2 output from the character GEN 12 is supplied to the adder 13 and is added to the output signal of the adder 5. The added signal is supplies to the EVF 14.

The display for the elapsed time will now be described. The cut time is set by the time-set button 9 at the beginning of the recording operation. A residual time indicator will then be displayed which becomes smaller as time goes on. When the residual time is zero, two types of displays may appear. One display shows a flashing "0". The other display shows the indicator becoming larger as time goes on after the residual time is zero.

As another example of a display relating an elapsed time, a display of "0" is given at the time of recording start and the elapsed time indicator become a larger value as time goes on.

Further, another example of a display relating an elapsed time is that the elapsed time is shown by a symbol such as a bar. In the case of the bar display, two examples of display are given. One is a display wherein a bar length corresponds to the elapsed time or a residual time. The other is a display wherein the bar length corresponds to a cut time (set by the time-set button 9) and the elapsed time and/or a residual time is shown by a different luminance or a different pattern within the bar at the same time.

Figure 2:
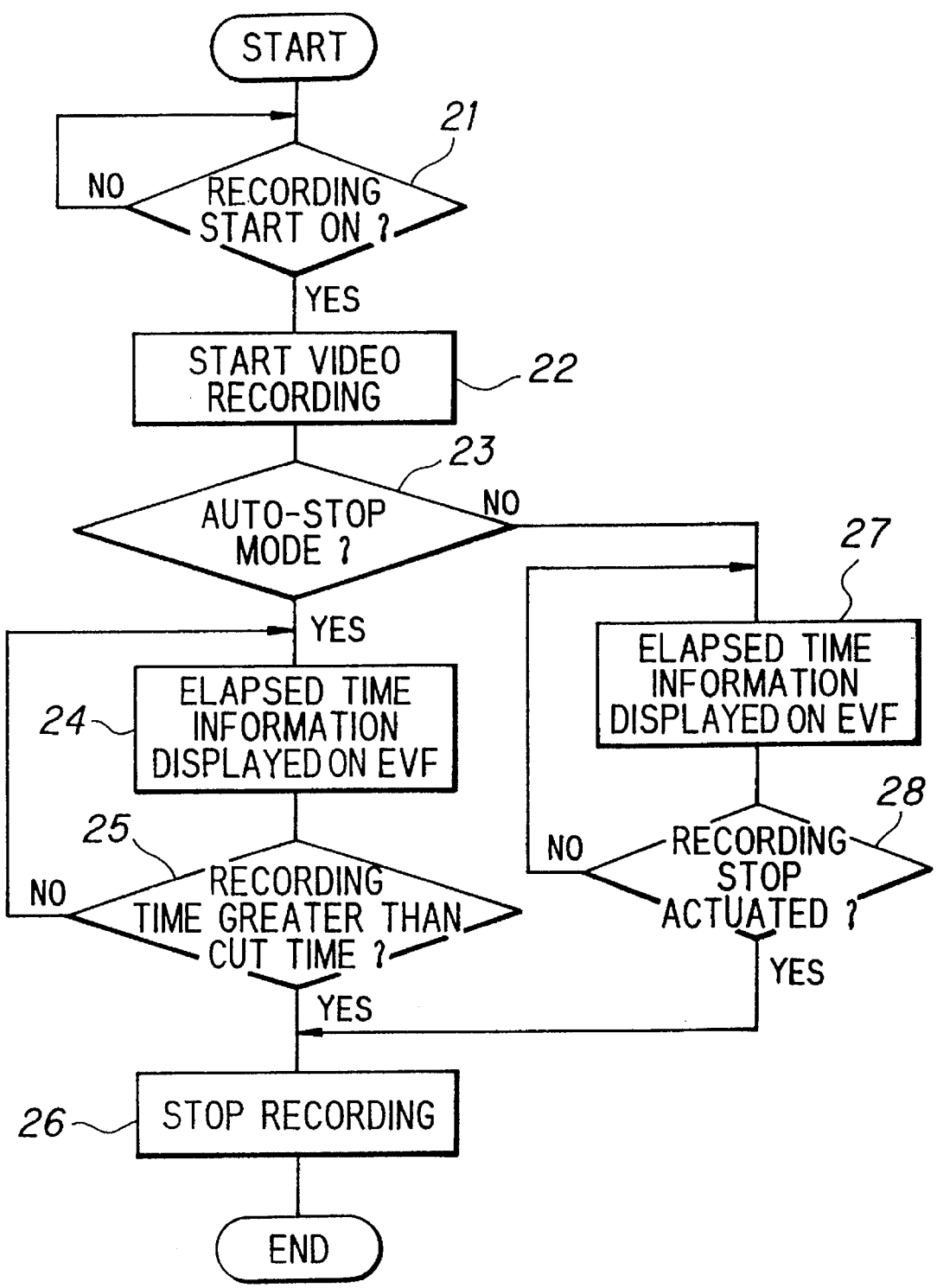
FIG. 2 is a flow chart explaining a recording operation of FIG. 1.

Next, the recording operation of this invention is explained, using the flow chart of FIG. 2 in conjunction with FIG. 1.

At step 21, a check is made as to whether the recording start is operated or not by pushing the S/S button 8. If the recording start is operated, the recording portion 6 starts a video recording at step 22.

At step 23, a check is made as to whether the mode is the auto-stop mode or not. If the auto-stop SW is on and the mode is the auto-stop mode, the display in EVF 14 such as a small cathode ray tube (CRT) display is reset at the time of recording start. Then the elapsed time is counted as time goes on and the matter relating to the elapsed time is displayed on the EVF 14 at step 24. Namely, the display signal S CH2 for displaying the matter relating the elapsed time is output from the character GEN 12.

At step 25, a check is made as to whether the recording time exceeds the cut time set by the time-set button or not. If the recording time does not exceed the cut time, the elapsed time is counted and displayed at step 24. When the recording time exceeds the cut time, the recording operation is stopped at step 26 and the recording operation is finished.

At step 23, if the auto-stop SW is off and the mode is not the auto-stop mode, the display in EVF 14 such as a small CRT display is reset at the time of recording start. Then the elapsed time is counted and the matter relating the elapsed time is displayed on the EVF 14 at step 27.

At step 28, a check is made as to whether the recording stop operation has been activated. As previously described, the recording stop operation is activated by pushing the S/S button 8. If the recording stop operation has not been actuated, the elapsed time is counted and displayed at step 27. When the recording stop is actuated, the recording operation is stopped at step 26 and the recording operation is finished.

Figure 3A:
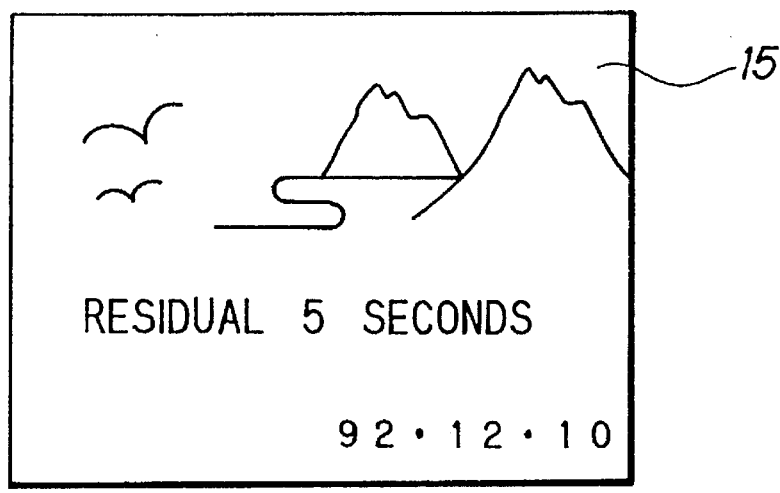
FIGS. 3A and 3B each show a CRT display depicting elapsed time.
Figure 3B:
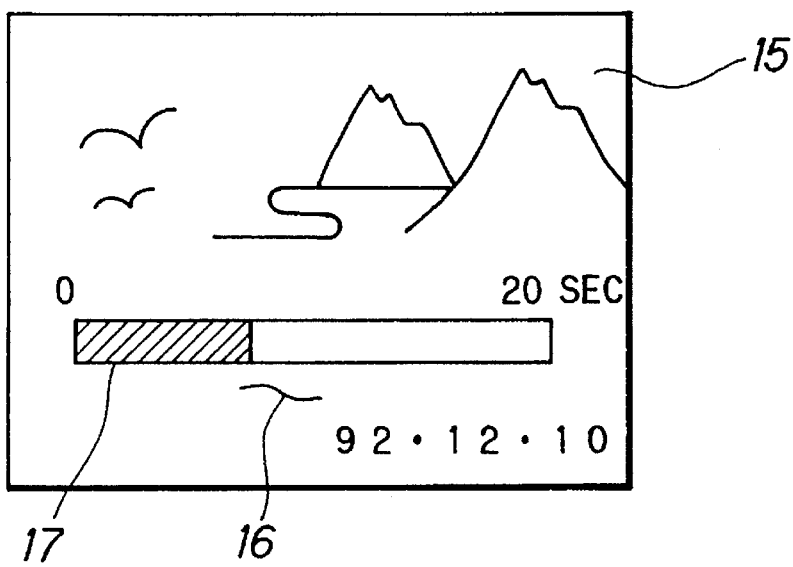

FIG. 3 is an example of a display relating the elapsed time shown on a CRT display 15 included in the EVF 14. FIG. 3A shows a residual time by a numerical value. FIG. 3B shows a residual time in conjunction with the elapsed time by a bar indicator 16 which has a length corresponding to a cut time. A different luminance or a different pattern 17 on the bar shows an elapsed time or a residual time.

Thus, since the CRT display 15 is reset at the time of recording start and then the display relating the elapsed time is shown on the CRT display 15, a user is able to ascertain the shot time. Therefore, it becomes easy to shoot each cut while reposing a video camera for a certain time period and it becomes possible to obtain a good scene.

Especially, because a cut time set by the time-set button 9 and a residual time are displayed, it is advantageous that the user can easily ascertain the end time of one cut. It is also advantageous that the user can get a shot time while watching the scene being shot on the EVF 14, because a cut time and a residual time are displayed on the EVF 14.

Furthermore, if the mode is the stop mode, the recording operation is stopped automatically when the recording time exceeds the cut time. Therefore, it is easy to obtain a good scene by shooting a scene while reposing a video camera until the recording operation stops.

As stated above, because each cut has a constant time, it becomes easy to see a scene. In addition, since each cut has a long enough time, it becomes easy to draw out a cut at the time of editing.

As another example, a information relating to elapsed time is displayed on an optical view finder (OVF) or on another display device besides a view finder.

This invention is applied to a video camera combined with a VTR in the above example. But this invention is also applied to a video camera not combined with a VTR.

Besides the above example, it is another example that an user gets a elapsed time by a electrical voice or voice synthesizer when the recording time exceeds the cut time.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the appended claims.

What is claimed is:

1. A video camera apparatus comprising:

a lens for focusing light reflected from a scene being recorded and transmitting said light through said lens;

an image pickup device for producing an output signal indicative of said light;

a camera signal processing circuit for changing said output signal of said image pickup device to a video signal;

a video signal recording portion for recording said video signal of said camera signal processing circuit, said video signal recording portion enabling recording for at least one recording metered time period, wherein the length of said recording method time period is dependent upon a recording method utilized to record said video signal on a recording medium;

a display member for displaying a state of said video signal recording portion;

a counter for counting an operating time on said video signal recording portion;

a system controller for controlling said video signal recording portion and said display member, wherein said counter is reset when a recording of said video signal starts and counts an elapsed time for recording said video signal and wherein said display member displays an indicator which indicates said elapsed time; and time setting means for setting a desired shot time for recording said scene selected from a range of shot times and for automatically stopping said recording when said elapsed time exceeds said shot time, wherein said desired shot time is the minimum amount of time desired for recording said scene and each of said shot times is shorter in length than said recording method time period to provide a range of available shot times which may be selected and set within said recording method time period.

2. A video camera apparatus according to claim 1, wherein said shot time is displayed when said recording starts, and said indicator is displayed after said recording starts.

3. A video camera apparatus according to claim 2 wherein said shot time is displayed in the shape of a band of a said display member.

4. A video camera apparatus according to claim 2 wherein said shot time is displayed by a numerical value on said display member.

5. A method for shooting a scene by using a video camera apparatus which has a camera signal processing circuit for changing an output signal of an image pickup device to a video signal, a video signal recording portion for recording an output signal of said camera signal processing circuit, a display member for displaying a state of said video signal recording circuit and a counter for counting an operating time on said video signal recording portion, said method comprising the steps of:

setting a recording start of a video signal;

starting a recording after said setting of said recording start;

resetting said counter;

counting an elapsed time after said recording starts;

displaying or recording a matter relating to said elapsed time;

setting a desired shot time selected from a range of shot times, said desired shot time being the minimum amount of time desired for recording a scene, wherein each of said shot times is included within a recording method time period and wherein the length of said recording method time period is dependent upon a recording method utilized to record said video signal on a recording medium; and automatically stopping said recording when said elapsed time exceeds from said shot time.

6. A method for shooting a scene according to claim 5, wherein said shot time is displayed when said recording starts and then said matter relating said elapsed time is displayed after said recording starts.

7. A method for st tooting a scene according to claim 6 wherein said shot time is displayed in the shape of a band on said display member.

8. A method for shooting a scene according to claim 7 wherein said shot time is displayed in the shape of a band on said display member.

\* \* \* \* \*